US010227475B2

(12) United States Patent
Darnaud et al.

(10) Patent No.: US 10,227,475 B2
(45) Date of Patent: Mar. 12, 2019

(54) TIRE COMPRISING A COMPOSITION ESSENTIALLY FREE OF GUANIDINE DERIVATIVE AND COMPRISING A PRIMARY AMINE

(71) Applicants: COMPAGNIE GENERALE DES ETABLISSEMENTS MICHELIN, Clermont-Ferrand (FR); Michelin Recherche et Techinique S.A., Granges-Paccot (CH)

(72) Inventors: Christelle Darnaud, Clermont-Ferrand (FR); Karine Longchambon, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 14/367,489

(22) PCT Filed: Dec. 17, 2012

(86) PCT No.: PCT/EP2012/075850
§ 371 (c)(1),
(2) Date: Jun. 20, 2014

(87) PCT Pub. No.: WO2013/092523
PCT Pub. Date: Jun. 27, 2013

(65) Prior Publication Data
US 2015/0322241 A1 Nov. 12, 2015

(30) Foreign Application Priority Data
Dec. 21, 2011 (FR) ...................................... 11 62181

(51) Int. Cl.
| C08K 5/17 | (2006.01) |
| C08L 9/00 | (2006.01) |
| C08L 9/06 | (2006.01) |
| C08K 5/372 | (2006.01) |
| C08K 5/548 | (2006.01) |
| C08L 23/20 | (2006.01) |
| C08K 3/04 | (2006.01) |
| C08K 3/36 | (2006.01) |
| C08K 5/47 | (2006.01) |
| B60C 1/00 | (2006.01) |
| C08L 91/00 | (2006.01) |

(52) U.S. Cl.
CPC ............ *C08K 5/548* (2013.01); *B60C 1/0016* (2013.01); *C08K 3/04* (2013.01); *C08K 3/36* (2013.01); *C08K 5/17* (2013.01); *C08K 5/47* (2013.01); *C08L 9/06* (2013.01); *C08L 23/20* (2013.01); *C08L 91/00* (2013.01); *B60C 2001/0066* (2013.01); *C08K 2201/019* (2013.01)

(58) Field of Classification Search
CPC .... C08K 3/36; C08K 5/17; C08L 9/00; C08L 9/06; C08L 21/00
See application file for complete search history.

(56) References Cited

U.S. PATENT DOCUMENTS

| 3,104,235 | A | * | 9/1963 | Kuntz | ..................... C08K 5/17 |
| | | | | | 525/332.3 |
| 3,451,458 | A | * | 6/1969 | Stueber | ..................... B60C 1/00 |
| | | | | | 152/209.1 |
| 5,086,136 | A | | 2/1992 | Takashima et al. | .......... 526/177 |
| 5,227,425 | A | | 7/1993 | Rauline | ......................... 524/493 |
| 5,852,099 | A | | 12/1998 | Vanel | ............................. 524/494 |
| 5,900,449 | A | | 5/1999 | Custodero et al. | ........... 524/430 |
| 5,977,238 | A | | 11/1999 | Labauze | ....................... 524/492 |
| 6,013,718 | A | | 1/2000 | Cabioch et al. | .............. 524/506 |
| 6,420,488 | B1 | | 7/2002 | Penot | ......................... 525/332.7 |
| 6,503,973 | B2 | | 1/2003 | Robert et al. | ................. 524/492 |
| 6,536,492 | B2 | | 3/2003 | Vasseur | ......................... 152/450 |
| 6,774,255 | B1 | * | 8/2004 | Tardivat | ................ C07F 7/0836 |
| | | | | | 528/30 |
| 6,815,473 | B2 | | 11/2004 | Robert et al. | .................. 523/215 |
| 7,217,751 | B2 | | 5/2007 | Durel et al. | ................... 524/262 |
| 7,250,463 | B2 | | 7/2007 | Durel et al. | ................... 524/492 |
| 7,300,970 | B2 | | 11/2007 | Durel et al. | ................... 524/493 |
| 7,312,264 | B2 | | 12/2007 | Gandon-Pain | ................ 524/236 |
| 7,335,692 | B2 | | 2/2008 | Vasseur et al. | ................ 524/312 |
| 7,488,768 | B2 | | 2/2009 | Tardivat et al. | ............... 524/262 |
| 7,491,767 | B2 | | 2/2009 | Durel et al. | ................... 524/493 |
| 7,820,771 | B2 | | 10/2010 | Lapra et al. | ................... 525/479 |
| 8,344,063 | B2 | | 1/2013 | Marechal et al. | ............. 524/571 |

(Continued)

FOREIGN PATENT DOCUMENTS

| EP | 0 391 692 A1 | 10/1990 |
| EP | 0 501 227 A1 | 9/1992 |

(Continued)

OTHER PUBLICATIONS

Machine translated English langugae equivalent of JP 2000-053806 (Feb. 2000, 5 pages).*
STN abstract of JP 2000-053806 (Feb. 2000, 2 pages).*
Bernard C. Barton, "Use of Oxidizing Agents in Rubber Vulcanization—Zinc Oxide-Free Process", Industrial and Engineering Chemistry, vol. 42, No. 4, Apr. 1, 1950, pp. 671-674.
Gary R. Hamed, et al., "Effects of Hydrocarbon and Amine Diluents on the Properties of Dicumyl Peroxide Cured Styrene-Butadiene Rubber, Part 1: Gum Compositions", Rubber Chemistry and Technology, American Chemical Society, Rubber Division, vol. 68, No. 2, May 1, 1995, pp. 212-218.

(Continued)

*Primary Examiner* — Brieann R Johnston
(74) *Attorney, Agent, or Firm* — Venable LLP

(57) ABSTRACT

A tire comprises a rubber composition based on at least one diene elastomer, a reinforcing filler predominantly comprising silica, a crosslinking system, and a primary amine of formula (I): R—NH$_2$ (I), in which R represents a linear or branched hydrocarbon group comprising from 8 to 24 carbon atoms. The rubber composition is essentially devoid of guanidine derivative.

37 Claims, No Drawings

(56) References Cited

U.S. PATENT DOCUMENTS

| | | | |
|---|---|---|---|
| 8,455,584 B2 | 6/2013 | Robert et al. | 524/505 |
| 8,461,269 B2 | 6/2013 | Varagniat et al. | 525/209 |
| 8,492,475 B2 | 7/2013 | Araujo Da Silva et al. | 524/552 |
| 8,492,479 B2 | 7/2013 | Robert et al. | 525/89 |
| 9,303,148 B2 * | 4/2016 | Cambon | B60C 1/0016 |
| 2002/0156169 A1 | 10/2002 | Kondo et al. | 524/432 |
| 2003/0171478 A1 | 9/2003 | Resendes | 524/492 |
| 2004/0051210 A1 | 3/2004 | Tardivat et al. | 264/349 |
| 2008/0269387 A1 | 10/2008 | Resendes et al. | 524/186 |
| 2008/0319119 A1 | 12/2008 | Waddell et al. | 524/445 |
| 2009/0186961 A1 | 7/2009 | Araujo Da Silva et al. | 523/150 |
| 2009/0209709 A1 | 8/2009 | Araujo Da Silva et al. | 525/333.1 |
| 2009/0234066 A1 | 9/2009 | Araujo Da Silva et al. | 524/571 |
| 2009/0270558 A1 | 10/2009 | Gandon-pain et al. | 525/190 |
| 2009/0297827 A1 | 12/2009 | Lapra et al. | 428/323 |
| 2010/0059160 A1 | 3/2010 | Sandstrom | 152/525 |
| 2010/0081761 A1 * | 4/2010 | Reuvekamp | A61L 9/122, 524/571 |
| 2010/0317765 A1 | 12/2010 | Resendes et al. | 523/157 |
| 2011/0021702 A1 | 1/2011 | Gandon-Pain et al. | 525/55 |
| 2011/0152405 A1 | 6/2011 | Thomasson et al. | 523/155 |
| 2011/0190416 A1 * | 8/2011 | Maesaka | B60C 1/0016, 523/155 |
| 2012/0208948 A1 | 8/2012 | Gandon-Pain et al. | 524/521 |
| 2012/0252928 A1 | 10/2012 | Marechal et al. | 523/155 |

FOREIGN PATENT DOCUMENTS

| | | | |
|---|---|---|---|
| EP | 0 599 643 A1 | 6/1994 | |
| EP | 0 735 088 A1 | 10/1996 | |
| EP | 0 810 258 A1 | 12/1997 | |
| EP | 1 127 909 A1 | 8/2001 | |
| EP | 1 219 676 A1 | 7/2002 | |
| EP | 1 329 479 A1 | 7/2003 | |
| EP | 2 241 592 A1 | 10/2010 | |
| FR | 2 740 778 A1 | 5/1997 | |
| FR | 2 765 882 A1 | 1/1999 | |
| JP | 53-128647 B2 | 11/1978 | |
| JP | 1 601 434 | 10/1981 | |
| JP | 3-197536 A | 8/1991 | |
| JP | 2000-17107 A | 1/2000 | |
| JP | 2000-53806 A | 2/2000 | |
| JP | 2000053806 A * | 2/2000 | |
| JP | 2001-164043 A | 6/2001 | |
| JP | 2001-192506 A | 7/2001 | |
| JP | 2004-51869 A | 2/2004 | |
| JP | 2004-511601 A | 4/2004 | |
| JP | 2005-139241 A | 6/2005 | |
| WO | 97/36724 | 10/1997 | |
| WO | 99/16600 | 4/1999 | |
| WO | 00/05300 A1 | 2/2000 | |
| WO | 00/005301 A1 | 2/2000 | |
| WO | 01/92402 A1 | 12/2001 | |
| WO | 02/30939 A1 | 4/2002 | |
| WO | 02/31041 A1 | 4/2002 | |
| WO | 02/083782 A1 | 10/2002 | |
| WO | 02/088238 A1 | 11/2002 | |
| WO | 03/002648 A1 | 1/2003 | |
| WO | 03/002649 A1 | 1/2003 | |
| WO | 03/016387 A1 | 2/2003 | |
| WO | 2004/096865 A2 | 11/2004 | |
| WO | 2006/063442 A1 | 6/2006 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2007/003408 A1 | 1/2007 | |
| WO | 2008/003434 A1 | 1/2008 | |
| WO | 2008/003435 A1 | 1/2008 | |
| WO | 2008/141702 A1 | 11/2008 | |
| WO | 2009/000750 A1 | 12/2008 | |
| WO | 2009/000752 A1 | 12/2008 | |
| WO | 2009/112463 A1 | 9/2009 | |
| WO | WO 2010009850 A1 * | 1/2010 | B60C 1/0016 |
| WO | 2011/042507 A1 | 4/2011 | |
| WO | 2011/073186 A1 | 6/2011 | |

OTHER PUBLICATIONS

Technical data sheet for N,N'-bis(2-hydroxyethyl)piperazine, www.chemicaland21.com.

Office Action dated Sep. 16, 2016, in counterpart JP application No. 2014-547905 (8 pages including English translation).

* cited by examiner

TIRE COMPRISING A COMPOSITION ESSENTIALLY FREE OF GUANIDINE DERIVATIVE AND COMPRISING A PRIMARY AMINE

FIELD OF THE INVENTION

The invention relates to tyres and more particularly to those for which the composition comprises a primary amine.

RELATED ART

Since fuel savings and the need to protect the environment have become a priority, it has proved necessary to produce tyres having a reduced rolling resistance, without adversely affecting other properties of the tyre. Manufacturers have developed tyre compositions which make it possible to reduce this rolling resistance, in particular by the introduction of silica into the mixtures as reinforcing filler.

Nevertheless, manufacturers are always looking for solutions for further lowering the rolling resistance of tyres and it is in this context that the Applicant Companies have discovered, surprisingly, that the introduction of a primary amine, as replacement for guanidine derivatives, makes it possible to reduce the hysteresis of diene rubber compositions comprising silica as predominant reinforcing filler.

Furthermore, this solution exhibits numerous other advantages in comparison with the compositions of the prior art and in particular the use of a compound which is cheaper and which makes possible an improvement in the environmental footprint.

Primary amines have already been used in tyre compositions different from those of the invention and for other purposes than that of reducing the hysteresis of the compositions. For example, the document JP 2000-017107 describes the use of alkylamines of low molar masses for improving the processability of a mixture of diene elastomer and silica, in the presence of diphenylguanidine (DPG). In addition, the document EP 2 241 592 describes the use of a low content of alkylamine (0.25 phr) in a mixture comprising carbon black and natural rubber predominantly.

Nevertheless, these primary amines have never been used as proposed by the Applicant Companies to replace guanidine derivatives in diene elastomer mixtures comprising silica as predominant filler, with the advantages presented above.

BRIEF DESCRIPTION OF EMBODIMENTS OF THE INVENTION

The invention thus relates to a tyre comprising a rubber composition based on at least one diene elastomer, a reinforcing filler predominantly comprising silica and a cross-linking system, the said composition being essentially devoid of guanidine derivative and additionally comprising a primary amine of formula (I):

$$R-NH_2 \qquad (I)$$

in which R represents a linear or branched hydrocarbon group comprising from 8 to 24 carbon atoms.

Preferably, the invention relates to a tyre as defined above, in which the composition comprising the primary amine comprises less than 0.45 phr of guanidine derivative and preferably less than 0.4 phr.

Preferably again, the invention relates to a tyre as defined above, in which the content of a primary amine is from 0.2 to 8 phr, preferably from more than 0.3 phr to 7 phr. More preferably, the content of a primary amine is from 0.5 to 5 phr, preferably from more than 0.6 phr to 4 phr.

More preferably, the invention relates to a tyre as defined above in which the primary amine of formula (I) bears an R radical which represents a hydrocarbon group comprising from 10 to 22 carbon atoms. More preferably, R represents a hydrocarbon group comprising from 12 to 20 carbon atoms and preferably from 14 to 20 carbon atoms. More preferably still, the primary amine of formula (I) bears an R radical which represents a linear hydrocarbon. Preferably, the R group represents an alkyl group or an alkenyl group.

Preferably, the invention relates to a tyre as defined above, in which the silica content is from 30 to 150 phr.

Preferably again, the invention relates to a tyre as defined above, in which the reinforcing filler comprises carbon black, in a minor amount. Preferably, the content of carbon black is from 0.5 to 50 phr.

More preferably, the invention relates to a tyre as defined above, in which the diene elastomer is selected from the group consisting of polybutadienes, synthetic polyisoprenes, natural rubber, butadiene copolymers, isoprene copolymers (such as butadiene/styrene copolymers, isoprene/butadiene copolymers, isoprene/styrene copolymers and isoprene/butadiene/styrene copolymers) and the mixtures of these elastomers.

According to a preferred form, the invention relates to a tyre as defined above, in which the diene elastomer is predominantly composed of non-isoprene diene elastomer.

Preferably, the invention relates to a tyre as defined above, in which the diene elastomer is composed of 100 phr of non-isoprene diene elastomer.

Preferably again, the invention relates to a tyre as defined above, in which the non-isoprene diene elastomer is selected from the group consisting of polybutadienes, butadiene copolymers, isoprene copolymers (such as butadiene/styrene copolymers, isoprene/butadiene copolymers, isoprene/styrene copolymers and isoprene/butadiene/styrene copolymers) and the mixtures of these elastomers.

More preferably, the invention relates to a tyre as defined above, in which the composition additionally comprises a plasticizer preferably chosen from plasticizing resins, extending oils and their mixtures.

Preferably, the invention relates to a tyre as defined above, in which the plasticizer content is from 5 to 100 phr.

Preferably, the invention relates to a tyre as defined above, in which the composition is in addition devoid of zinc or comprises less than 0.5 phr, preferably less than 0.3 phr, thereof.

Preferably again, the invention relates to a tyre as defined above, additionally comprising a coupling agent.

Preferably, the invention relates to a tyre as defined above, in which the coupling agent is a hydroxysilane polysulphide corresponding to the general formula (III):

$$(HO)_a R_{(3-a)} Si-R'-S_x-R'-SiR_{(3-b)}(OH)_b \qquad (III)$$

in which:
- the R radicals, which are identical or different, are hydrocarbon groups preferably comprising from 1 to 15 carbon atoms;
- the R' radicals, which are identical or different, are divalent connecting groups preferably comprising from 1 to 18 carbon atoms;
- a and b, which are identical or different, are equal to 1 or 2;
- x is a number greater than or equal to 2.

More preferably, the invention relates to a tyre as defined above, in which the coupling agent is a monohydroxysilane in which a and b are equal to 1.

More preferably still, the invention relates to a tyre as defined above, in which the R radicals are chosen from linear or branched $C_1$-$C_6$ alkyls, $C_5$-$C_8$ cycloalkyls or a phenyl radical; the R' radicals are chosen from $C_1$-$C_{18}$ alkylenes or $C_6$-$C_{12}$ arylenes. More particularly, the R radicals are chosen from $C_1$-$C_6$ alkyls and the R' radicals from $C_1$-$C_{10}$ alkylenes.

Very preferably, the invention relates to a tyre as defined above, in which the hydroxysilane is a monohydroxysilane polysulphide of formula (IV):

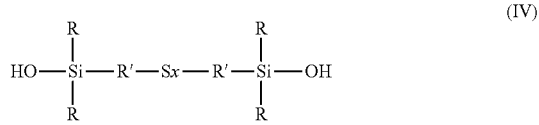

(IV)

in which the R radicals are $C_1$-$C_3$ alkyls, preferably methyl; the R' radicals are $C_1$-$C_4$ alkylenes, preferably methylene, ethylene or propylene; x is greater than or equal to 2. More particularly, the hydroxysilane is a bis(propyldimethylsilanol) polysulphide of specific formula (IVa):

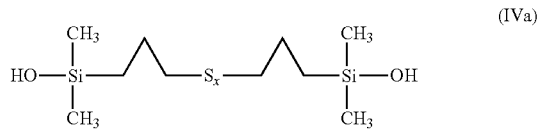

(IVa)

Preferably, the invention relates to a tyre as defined above, in which the composition comprising the primary amine is the composition of a tyre layer selected from the group consisting of all or part of the tread, of all or part of the tyre belt and their combinations.

Preferably, the invention relates to a tyre as defined above, in which the composition comprising the primary amine is that of all or part of the tread.

The tyre according to the invention can comprise the composition described above in one or more of its various layers, such as, for example, the tread, the plies of the tyre belt, the carcass ply or any other layer. Within the meaning of the present patent application, the tyre tread denotes the rubber layer in contact with the ground, completely (that is to say, over its entire thickness) or a portion of the latter (including the underlayer), in particular when it is composed of several layers.

Preferably, the invention relates to a tyre as defined above, in which the composition comprising the primary amine is the composition of a tyre layer selected from the group consisting of all or part of the tread, of all or part of the tyre belt and their combinations.

Preferably, the invention relates to a tyre as defined above, in which the composition specified is that of all or part of the tread.

Preferably, the tyre according to the invention will be chosen from the tyres intended to equip a two-wheel vehicle, a passenger vehicle, or also a heavy-duty vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION OF THE INVENTION

I—Constituents of the Composition

The rubber compositions according to the invention are based on the following constituents: at least one diene elastomer, a reinforcing filler, a crosslinking system and a primary amine.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I-1 Diene Elastomer

The compositions can comprise just one diene elastomer or a mixture of several diene elastomers.

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

The diene elastomers can be classified into two categories: "essentially unsaturated" or "essentially saturated". Generally, "essentially unsaturated" is understood to mean a diene elastomer resulting at least in part from conjugated diene monomers having a content of units of diene origin (conjugated dienes) which is greater than 15% (mol %); thus it is that diene elastomers, such as butyl rubbers or copolymers of dienes and α-olefins of EPDM (ethylene propylene diene monomer) type, do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the compositions according to the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d)—a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, statistical, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the composition is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

According to a specific embodiment, the composition comprises from 50 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or also SBR/BR/NR (or SBR/BR/IR) blend.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment, the diene elastomer is a predominantly isoprene elastomer (that is to say, the fraction by weight of isoprene elastomer of which is the greatest, compared with the fraction by weight of the other elastomers). "Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

Preferably, according to another embodiment, the rubber composition predominantly comprises (that is to say, with the highest content by weight) a non-isoprene diene elastomer. "Non-isoprene diene elastomer" should be understood, within the meaning of the present patent application, as indicating an elastomer resulting at least in part (i.e., a homopolymer or a copolymer) from diene monomers (monomers bearing two carbon-carbon double bonds) other than isoprene. Thus, non-isoprene diene elastomers within the meaning of the present definition thus also comprise copolymers comprising isoprene as comonomer. Natural rubber and isoprene homopolymers (that is to say, composed of functionalized or non-functionalized isoprene monomers) are excluded from the present definition. According to this preferred embodiment, all the abovementioned elastomers, with the exception of natural rubber and polyisoprenes, are suitable as non-isoprene diene elastomer. In particular, it will be possible to use non-isoprene diene elastomers preferably selected from the group of highly unsaturated diene elastomers consisting of polybutadienes (abbreviated to "BRs"), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs). Still according to this preferred embodiment, it will be understood that, in the case of a blend of elastomers, the total content of the "non-isoprene" elastomers must be greater than the total content of the elastomers selected from the group consisting of natural rubber, synthetic polyisoprenes and their mixtures. Preferably, according to this embodiment, the content of non-isoprene diene elastomer is more than 50 phr, more preferably at least 60 phr, more preferably at least 70 phr, more preferably still at least 80 phr and very preferably at least 90 phr. In particular, according to this embodiment, the content of non-isoprene diene elastomer is very preferably 100 phr.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably selected from the group consisting of S-SBRs, E-SBRs, natural rubber, synthetic polyisoprenes (exhibiting a content (mol %) of cis-1,4-enchainments preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-enchainments of greater than 90%.

According to another specific embodiment of the invention, the rubber composition comprises, for example, between 30 and 90 phr, in particular between 40 and 90 phr, of a high Tg elastomer as a blend with a low Tg elastomer.

According to another specific embodiment of the invention, the diene elastomer of the composition according to the invention comprises a blend of a BR (as low Tg elastomer) exhibiting a content (mol %) of cis-1,4-enchainments of greater than 90% with one or more S-SBRs or E-SBRs (as high Tg elastomer(s)).

I-2 Reinforcing Filler

The tyre according to the invention comprises a composition which predominantly comprises silica as reinforcing filler. The term "predominant reinforcing filler" is understood to mean that which exhibits the greatest content among the reinforcing fillers present in the composition. In particular, the term "predominant reinforcing filler" is understood to mean any reinforcing filler which represents at least 50% by weight of the reinforcing fillers present, preferably more than 50% and more preferably more than 60%.

The physical state under which the reinforcing filler is provided is not important, whether it is in the form of a powder, of microbeads, of granules, of beads or any other appropriate densified form.

The fraction by volume of reinforcing filler in the rubber composition is defined as being the ratio of the volume of the reinforcing filler to the volume of all the constituents of the composition, it being understood that the volume of all the constituents is calculated by adding together the volumes of each of the constituents of the composition. The fraction by volume of reinforcing filler in a composition is thus defined as the ratio of the volume of the reinforcing filler to the sum of the volumes of each of the constituents of the composition; typically, this fraction by volume is between 10% and 30% and preferably between 15% and 25%. In an equivalent preferred way, the content of total reinforcing filler (carbon black and/or reinforcing inorganic filler, such as silica) is from 30 to 200 phr, more preferably from 30 to 150 phr and very preferably from 50 to 135 phr.

According to a preferred embodiment of the invention, use is made of a reinforcing filler comprising from 30 to 150 phr of silica, more preferably from 50 to 130 phr of silica, and optionally carbon black; the carbon black, when it is present, is used in combination with the silica, more preferably at a content of 0.5 to 50 phr, more preferably still of 1 to 20 phr (in particular between 1 and 10 phr).

The composition can comprise one type of silica or a blend of several silicas. The silica used can be any reinforcing silica known to a person skilled in the art, in particular any precipitated or fumed silica exhibiting a BET specific surface and a CTAB specific surface both of less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16387.

The silica preferably has a BET specific surface of between 45 and 400 m$^2$/g, more preferably of between 60 and 300 m$^2$/g.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (II):

Z-A-S$_x$-A-Z, (II)

in which:
x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$, in particular $C_1$-$C_4$, alkylenes, in particular propylene);
Z corresponds to one of the formulae below:

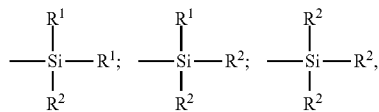

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (II), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula [($C_2H_5O)_3Si(CH_2)_3S_2]_2$, or bis(triethoxysilylpropyl) disulphide, abbreviated to TESPD, of formula [($C_2H_5O)_3Si(CH_2)_3S]_2$. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will also be made, as coupling agent other than an alkoxysilane polysulphide, of bifunctional POSs (polyorganosiloxanes) or else of hydroxysilane polysulphides ($R^2$=OH in the above formula II), such as described in Patent Applications WO 02/30939 (or U.S. Pat. No. 6,774, 255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In particular and preferably, the coupling agent can be a hydroxysilane polysulphide (as described in the abovementioned documents) corresponding to the general formula (III):

(HO)$_a$R$_{(3-a)}$Si—R'—S$_x$—R'—SiR$_{(3-b)}$(OH)$_b$ (III)

in which:
the R radicals, which are identical or different, are hydrocarbon groups preferably comprising from 1 to 15 carbon atoms;
the R' radicals, which are identical or different, are divalent connecting groups preferably comprising from 1 to 18 carbon atoms;
a and b, which are identical or different, are equal to 1 or 2;
x is a number greater than or equal to 2.

The R radicals, which are identical or different, linear or branched and preferably comprise from 1 to 15 carbon atoms, are more preferably chosen from alkyls, cycloalkyls or aryls, in particular from $C_1$-$C_6$ alkyls, $C_5$-$C_8$ cycloalkyls and the phenyl radical. Mention will in particular be made, among these radicals, by way of examples, of those selected from the group consisting of methyl, ethyl, n-propyl, isopropyl, n-butyl, sec-butyl, tert-butyl, n-pentyl, neopentyl, n-hexyl, 2-ethylhexyl, n-octyl, isooctyl, cyclopentyl, cyclohexyl, 2-methylcyclohexyl, phenyl, toluyl and benzyl.

More preferably still, the R radicals, which are identical or different, are $C_1$-$C_3$ alkyls (namely methyl, ethyl, n-propyl or isopropyl), very particularly chosen from methyl and ethyl.

The R' radicals, which are identical or different and substituted or unsubstituted, are preferably saturated or unsaturated hydrocarbon radicals comprising from 1 to 18 carbon atoms, it being possible for these R' radicals to be interrupted within the hydrocarbon chain by at least one heteroatom, such as O, S or N. Suitable in particular are $C_1$-$C_{18}$ alkylene groups or $C_6$-$C_{12}$ arylene groups, more particularly $C_1$-$C_{10}$, in particular $C_1$-$C_4$, alkylenes, especially those chosen from methylene, ethylene and propylene.

Preferably, in the hydroxysilane polysulphides corresponding to the general formula (III), the hydroxysilane is a monohydroxysilane, that is to say that a and b are equal to 1. Preferably again, the R radicals are chosen from linear or branched $C_1$-$C_6$ alkyls, $C_5$-$C_8$ cycloalkyls or a phenyl radical; the R' radicals are chosen from $C_1$-$C_{18}$ alkylenes or $C_6$-$C_{12}$ arylenes, and more particularly the R radicals are chosen from $C_1$-$C_6$ alkyls and the R' radicals are chosen from $C_1$-$C_{10}$ alkylenes.

Thus, very preferably, the hydroxysilane is a monohydroxysilane polysulphide of formula (IV):

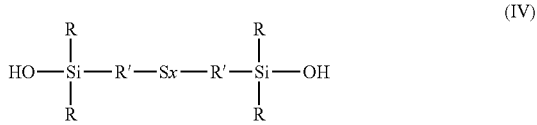

(IV)

in which the R radicals are $C_1$-$C_3$ alkyls, preferably methyl; the R' radicals are $C_1$-$C_4$ alkylenes, preferably methylene, ethylene or propylene; x is greater than or equal to 2.

More particularly, the hydroxysilane can be a bis(propyldimethylsilanol) polysulphide of specific formula (IVa):

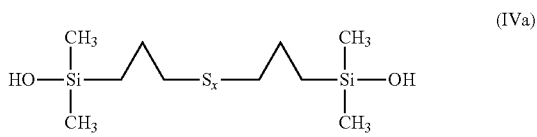

(IVa)

This product of formula (IVa) corresponds to the product D in the abovementioned document WO 02/31041 (or US 2004/051210).

In the rubber compositions in accordance with the invention, the content of coupling agent is preferably between 2 and 15 phr, more preferably between 3 and 13 phr and more preferably still between 5 and 10 phr.

Use may be made, in addition to silica, of any type of reinforcing filler known for its abilities to reinforce a rubber composition which can be used for the manufacture of tyres, for example an organic filler, such as carbon black, a reinforcing inorganic filler, such as alumina, or also a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

A person skilled in the art will understand that, as filler equivalent to silica described in the present section, use might be made of a reinforcing filler of another nature, in particular organic nature, provided that this reinforcing filler is covered with a layer of silica or else comprises functional sites, in particular hydroxyl sites, at its surface which require the use of a coupling agent in order to form the bond between the filler and the elastomer.

I-3 Crosslinking System

The crosslinking system can be a vulcanization system; it is preferably based on sulphur or sulphur donors and on primary vulcanization accelerator (preferably 0.5 to 10.0 phr of primary accelerator). Additional to this vulcanization system are optionally various known secondary vulcanization accelerators or vulcanization activators, such as zinc oxide (preferably for 0.5 to 10.0 phr) or stearic acid or others (preferably for 0.5 to 5.0 phr each). The sulphur is used at a preferred content of between 0.5 and 10 phr, more preferably of between 0.5 and 5.0 phr, for example between 0.5 and 3.0 phr when the invention is applied to a tyre tread.

Use may be made, as (primary or secondary) accelerator, of any compound capable of acting as accelerator of the vulcanization of diene elastomers in the presence of sulphur, in particular accelerators of the thiazole type and their derivatives and accelerators of the thiuram and zinc dithiocarbamate types. These accelerators are more preferably selected from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI"), zinc dibenzyldithiocarbamate (abbreviated to "ZBEC") and the mixtures of these compounds. Preferably, use is made of a primary accelerator of the sulphenamide type.

On the other hand, in the tyres according to the invention, the composition comprising the primary amine necessary for the requirements of the invention is devoid of guanidine derivative or comprises less than 0.5 phr thereof. Preferably, the composition is either completely devoid of such compounds or it comprises less than 0.45 phr, preferably less than 0.4 phr, more preferably less than 0.3 phr, preferably less than 0.2 phr and very preferably less than 0.1 phr thereof. The term "guanidine derivative" is understood to mean the organic compounds bearing a guanidine functional group as main functional group, such as those known in tyre compositions, in particular as vulcanization accelerators, for example diphenylguanidine (DPG) or di(ortho-tolyl)guanidine (DOTG).

According to a preferred form, in the tyre according to the invention, the composition comprising the amino ether alcohol necessary for the requirements of the invention is also devoid of zinc or comprises less than 0.5 phr, preferably less than 0.3 phr, more preferably less than 0.2 phr and very preferably less than 0.1 phr thereof.

I-4 Primary Amine

In order to advantageously replace the guanidine derivatives mentioned above, the tyre according to the invention comprises a primary amine of formula (I):

(I)

in which R represents a linear or branched hydrocarbon group comprising from 8 to 24 carbon atoms.

Preferably, R represents a linear or branched hydrocarbon group comprising from 10 to 22 carbon atoms, more preferably from 12 to 20 carbon atoms and very preferably from 14 to 20 carbon atoms. Preferably, R represents a linear hydrocarbon group.

The term "hydrocarbon group" is understood to mean, within the meaning of the present invention, a saturated or unsaturated group comprising carbon and hydrogen atoms, such as an alkyl or alkenyl group. Preferably, the hydrocarbon group comprises from 0 to 3 unsaturations, preferably 0, 1 or 2.

Preferably, the hydrocarbon group is saturated; it is thus an alkyl group.

Alternatively and again preferably, this hydrocarbon group is unsaturated; it is thus an alkenyl group.

Preferably, the primary amine as defined above can be chosen from linear alkylamines. Very preferably, it is hexadecylamine or octadecylamine, and in particular octadecylamine.

Octadecylamine (or stearylamine) is commercially available, for example in the powder form, from a supplier, such as Aldrich.

Preferably, the content of primary amine in the composition is within a range varying from 0.2 to 8 phr, more preferably from 0.3 to 7 phr, preferably from more than 0.5 to 5 phr and more preferably from 0.6 to 4 phr.

It may be noted that the primary amine as defined herein is introduced in the free base form, that is to say not forming a salt with an inorganic or organic acid.

I-5 Other Possible Additives

The rubber compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents, such as those provided below, anti-fatigue agents, reinforcing resins, or methylene acceptors (for example novolak phenolic resin) or donors (for example HMT or H3M).

According to a preferred embodiment, the composition according to the invention additionally comprises a plasticizing agent. Preferably, this plasticizing agent is a solid hydrocarbon resin (or plasticizing resin), an extending oil (or plasticizing oil) or a mixture of the two.

When it is included in the composition, the content of total plasticizing agent is preferably greater than or equal to 5 phr, more preferably from 5 to 100 phr, in particular from 10 to 80 phr, for example from 15 to 70 phr.

According to a first preferred embodiment of the invention, the plasticizer is an extending oil which is liquid at 20° C., referred to as "low Tg", that is to say which, by definition, exhibits a Tg of less than −20° C., preferably of less than −40° C.

Any extending oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solids at ambient temperature.

Extending oils selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulphonate plasticizers and the mixtures of these compounds are particularly suitable. For example, mention may be made of those which comprise between 12 and 30 carbon atoms, for example trioctyl phosphate. Mention may in particular be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80% by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed of more than 50% by weight, more preferably still for more than 80% by weight, of oleic acid. Such triesters (trioleates) having a high content of oleic acid are well known; they have been described, for example, in Application WO 02/088238 as plasticizing agents in tyre treads.

Preferably, the content of extending oil is between 2 and 50 phr, more preferably between 3 and 40 phr and more preferably still between 5 and 35 phr.

According to another preferred embodiment of the invention, this plasticizing agent is a thermoplastic hydrocarbon resin, the Tg of which is greater than 0° C., preferably greater than 20° C. This resin is a solid at ambient temperature (23° C.), in contrast to a liquid plasticizing compound, such as an oil.

Preferably, the thermoplastic plasticizing hydrocarbon resin exhibits at least any one of the following characteristics:
a Tg of greater than 20° C., more preferably of greater than 30° C.;
a number-average molecular weight (Mn) of between 400 and 2000 g/mol, more preferably between 500 and 1500 g/mol;
a polydispersity index (PI) of less than 3, more preferably of less than 2 (as a reminder: PI=Mw/Mn with Mw the weight-average molecular weight).

More preferably, this thermoplastic plasticizing hydrocarbon resin exhibits all of the preferred characteristics above.

The macrostructure (Mw, Mn and PI) of the hydrocarbon resin is determined by steric exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic, based or not based on petroleum (if such is the case, also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins, which can be used alone or in combination with a liquid plasticizer, for example an MES or TDAE oil. The term "terpene" combines here, in a known way, α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferred resins above are well known to a person skilled in the art and are commercially available, for example sold as regards:

- polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
- $C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and Escorez 1273;
- limonene/styrene copolymer resins: by DRT under the name Dercolyte TS 105 from DRT or by Arizona Chemical Company under the names ZT115LT and ZT5100.

Mention may also be made, as examples of other preferred resins, of phenol-modified a-methylstyrene resins. In order to characterize these phenol-modified resins, it should be remembered that a number referred to as "hydroxyl number" (measured according to Standard ISO 4326 and expressed in mg KOH/g) is used in a known way. α-Methylstyrene resins, in particular phenol-modified ones, are well known to a person skilled in the art and are commercially available, for example sold by Arizona Chemical under the names Sylvares SA 100 (Mn=660 g/mol; PI=1.5; Tg=53° C.); Sylvares SA 120 (Mn=1030 g/mol; PI=1.9; Tg=64° C.); Sylvares 540 (Mn=620 g/mol; PI=1.3; Tg=36° C.; hydroxyl number=56 mg KOH/g); and Sylvares 600 (Mn=850 g/mol; PI=1.4; Tg=50° C.; hydroxyl number=31 mg KOH/g).

According to a specific embodiment of the invention, when it is included in the composition, the content of plasticizing hydrocarbon resin is between 5 and 50 phr, preferably between 7 and 40 phr and more preferably still between 10 and 35 phr. Preferably again, the content of plasticizing resin is between 5 and 20 phr and more preferably between 5 and 15 phr.

Of course, the compositions in accordance with the invention can be used alone or as a blend (i.e., as a mixture) with any other rubber composition which can be used for the manufacture of tyres.

It is obvious that the invention relates to the rubber compositions described above both in the "raw" or non-crosslinked state (i.e., before curing) and in the "cured" or crosslinked, or also vulcanized, state (i.e., after crosslinking or vulcanization).

II—Preparation of the Rubber Compositions

The compositions are manufactured in appropriate mixers, using two successive phases of preparation which are well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers and the reinforcing fillers (and optionally the coupling agents and/or other ingredients) are introduced into an appropriate mixer, such as an ordinary internal mixer, at a temperature between 20° C. and 100° C. and preferably between 25° C. and 100° C. After a few minutes, preferably from 0.5 to 2 min, and a rise in the temperature to 90° C. or to 100° C., the other ingredients (that is to say, those which remain, if not all were added at the start) are added all at once or in portions, with the exception of the crosslinking system, during a mixing ranging from 20 seconds to a few minutes. The total duration of the kneading, in this non-productive phase, is preferably between 2 and 10 minutes at a temperature of less than or equal to 180° C. and preferably of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for laboratory characterization, or also extruded, in order to form, for example, a rubber profiled element used for the manufacture of semi-finished products, in order to obtain products such as sidewalls, carcass ply, crown plies (or tyre belt), tread, bead-wire filling, tread underlayer or other elastomer layers, preferably the tread. These products can subsequently be used for the manufacture of tyres, according to the techniques known to a person skilled in the art.

The vulcanization (or curing) is carried out in a known way at a temperature generally between 130° C. and 200° C., under pressure, for a sufficient time which can vary, for example, between 5 and 90 min, as a function in particular of the curing temperature, of the vulcanization system adopted, of the kinetics of vulcanization of the composition under consideration or also of the size of the tyre.

The examples which follow illustrate the invention without, however, limiting it.

III—Examples of the Implementation of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Mooney Viscosity or Mooney Plasticity (Before Curing):

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter). For greater readability, the results will be shown in base 100, the value 100 being assigned to the control. A result of less than 100 will indicate a decrease in the value concerned and, conversely, a result of greater than 100 will indicate an increase in the value concerned.

Tensile Tests (after Curing):

These tests make it possible to determine the elasticity stresses and the properties at break. Unless otherwise indicated, they are based on Standard NF ISO 37 of December 2005. The "nominal" secant moduli (or apparent stresses, in MPa, with respect to the strain, without unit) at 100% elongation ("M100") are measured in second elongation (i.e., after an accommodation cycle). All these tensile measurements are carried out under the standard conditions of temperature (23±2° C.) and hygrometry (50±10% relative humidity). The breaking stresses (in MPa) and the elongations at break (in %) are also measured. For greater readability, the results will be shown in base 100, the value 100 being assigned to the control. A result of less than 100 will indicate a decrease in the value concerned and, conversely, a result of greater than 100 will indicate an increase in the value concerned.

Dynamic Properties (after Curing):

The dynamic properties G* and tan(δ)max are measured on a viscosity analyser (Metravib V A4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under the standard temperature conditions according to Standard ASTM D 1349-99, is recorded. A peak-to-peak strain amplitude sweep is carried out from 0.1% to 50% (outward cycle) and then from 50% to 1% (return cycle). The result made use of is the loss factor tan(δ). For the return cycle, the maximum value of tan(δ) observed (tan(δ)max) is indicated. The tan(δ)max values given below are measured at 23° C. For greater readability, the results will be shown in base 100, the value 100 being assigned to the control. A result of less than 100 will indicate a decrease in the value concerned and, conversely, a result of greater than 100 will indicate an increase in the value concerned.

III-3 Examples

III-3-1 Example I

The object of this example is to compare the various rubber properties of a control composition with compositions in accordance with the invention, that is to say comprising a diene elastomer, a reinforcing filler predominantly comprising silica, a crosslinking system, devoid of or comprising less than 0.5 phr of guanidine derivative and comprising a primary amine of formula (I) as defined above.

In particular, the compositions C-1 to C-3 were prepared and tested. The formula of the compositions C-1 and C-2 varies only in the replacement of DPG by octadecylamine (in an isomolar amount), as presented in Table 1. The composition C-3, for its part, is identical to the composition C-2 from which the zinc oxide has been deleted. The compositions C-2 and C-3, in accordance with the invention, are compared with the control composition C-1.

TABLE 1

|  | Composition | | |
| --- | --- | --- | --- |
|  | C-1 | C-2 | C-3 |
| SBR (1) | 100 | 100 | 100 |
| Carbon black (2) | 3 | 3 | 3 |
| Silica (3) | 110 | 110 | 110 |
| Coupling agent (4) | 9 | 9 | 9 |
| Antioxidant (5) | 2 | 2 | 2 |
| Plasticizing oil (6) | 12 | 12 | 12 |
| Plasticizing resin (7) | 46 | 46 | 46 |
| Zinc oxide | 1.2 | 1.2 | 0 |
| DPG (8) | 1.8 | 0 | 0 |
| Octadecylamine | 0 | 2.3 | 2.3 |
| Stearic acid | 2 | 2 | 2 |
| Accelerator (9) | 2.3 | 2.3 | 2.3 |
| Sulphur | 1 | 1 | 1 |

(1) SBR (Sn star-branched) with 27% of styrene units and 24% of 1,2-units of the butadiene part (Tg=−48° C.) bearing a silanol functional group at the end of the elastomer chain
(2) ASTM grade N234 (Cabot)
(3) Silica, Zeosil 1165 MP from Rhodia, "HDS" type
(4) Coupling agent: TESPT (Si69 from Evonik-Degussa)
(5) N-(1,3-Dimethylbutyl)-N'-phenyl-p-phenylenediamine (Santoflex 6-PPD) from Flexsys
(6) Sunflower oil comprising 85% by weight of oleic acid, Lubrirob Tod 1880 from Novance
(7) $C_5/C_9$ Resin, Escorez 1273 from Exxon
(8) Diphenylguanidine (Perkacit DPG from Flexsys)
(9) N-Cyclohexyl-2-benzothiazolesulphenamide (Santocure CBS from Flexsys)

The compositions are manufactured with introduction of all of the constituents onto an internal mixer, with the exception of the vulcanization system. The vulcanization agents (sulphur and accelerator) are introduced onto an external mixer at low temperature (the constituent rollers of the mixer being at approximately 30° C.).

The properties measured before and after curing are given in Table 2 below. For a better understanding and comparison of the tests, the results are given in base 100, that is to say that the experimental value for the control is reduced to the value 100 and then the values of the tests are given as a function of this base of 100 for the control.

TABLE 2

|  | Composition No. | | |
| --- | --- | --- | --- |
|  | C-1 | C-2 | C-3 |
| Mooney (in base 100) | 100 | 94 | 99 |
| M100 (in base 100) | 100 | 93 | 106 |
| Tan(δ)max (in base 100) | 100 | 85 | 85 |

In comparison with the control composition C-1, a significant fall of 15% in the hysteresis with regard to the tan(δ)max indicator is found for the compositions C-2 and C-3 in accordance with the invention, which is accompanied by properties otherwise similar, indeed even improved.

III-3-2 Example II

The object of this example is to compare the various rubber properties of a control composition with a composition in accordance with the invention, that is to say comprising a diene elastomer, a reinforcing filler predominantly comprising silica, a crosslinking system, devoid of or comprising less than 0.5 phr of guanidine derivative and comprising a primary amine of formula (I) as defined above, in the case of the use of a coupling agent different from that of the preceding example.

The compositions C-4 and C-5 were prepared and tested. The formula of the compositions C-4 and C-5 varies only in the replacement of DPG by octadecylamine (in an isomolar amount), as presented in Table 3.

TABLE 3

|  | Composition | |
|---|---|---|
|  | C-4 | C-5 |
| SBR (1) | 100 | 100 |
| Carbon black (2) | 3 | 3 |
| Silica (3) | 110 | 110 |
| Coupling agent (4) | 6.5 | 6.5 |
| Antioxidant (5) | 2 | 2 |
| Plasticizing oil (6) | 12 | 12 |
| Plasticizing resin (7) | 46 | 46 |
| Zinc oxide | 0 | 0 |
| DPG (8) | 1.8 | 0 |
| Octadecylamine | 0 | 2.3 |
| Stearic acid | 2 | 2 |
| Accelerator (9) | 2.3 | 2.3 |
| Sulphur | 1 | 1 |

(1) SBR with 27% of styrene units and 24% of 1,2-units of the butadiene part (Tg = −48° C.) bearing a silanol functional group
(2) ASTM grade N234 (Cabot)
(3) Silica, Zeosil 1165 MP from Rhodia, "HDS" type
(4) Coupling agent: bis(propyldimethylsilanol) polysulphide, as described in the document WO 02/31041 (or US 2004/051210)
(5) N-(1,3-Dimethylbutyl)-N'-phenyl-p-phenylenediamine (Santoflex 6-PPD) from Flexsys
(6) Sunflower oil comprising 85% by weight of oleic acid, Lubrirob Tod 1880 from Novance
(7) C5/C9 Resin, Escorez 1273 from Exxon
(8) Diphenylguanidine (Perkacit DPG from Flexsys)
(9) N-Cyclohexyl-2-benzothiazolesulphenamide (Santocure CBS from Flexsys)

The compositions are manufactured with introduction of all of the constituents onto an internal mixer, with the exception of the vulcanization system. The vulcanization agents (sulphur and accelerator) are introduced onto an external mixer at low temperature (the constituent rollers of the mixer being at approximately 30° C.).

The properties measured before and after curing are given in Table 4 below. For a better understanding and comparison of the tests, the results are given in base 100, that is to say that the experimental value for the control is reduced to the value 100 and then the values of the tests are given as a function of this base of 100 for the control.

TABLE 4

|  | Composition No. | |
|---|---|---|
|  | C-4 | C-5 |
| Mooney (in base 100) | 100 | 99 |
| M100 (in base 100) | 100 | 80 |
| Tan(δ)max (in base 100) | 100 | 92 |

In comparison with the control composition C-4, a significant fall of 8% in the hysteresis with regard to the tan(δ)max indicator is found for the composition C-5 in accordance with the invention, which is accompanied by properties otherwise similar, indeed even improved.

The invention claimed is:

1. A tire comprising a rubber composition based on:
   at least one diene elastomer,
   a reinforcing filler predominantly composed of silica,
   a crosslinking system that comprises sulfur, and
   a primary amine of formula (I):

$$R-NH_2 \qquad (I),$$

in which R represents a linear or branched hydrocarbon group comprising from 8 to 24 carbon atoms,
   wherein the rubber composition includes less than 0.5 phr of guanidine derivative,
   wherein the rubber composition comprises less than 0.5 phr zinc, and
   wherein the rubber composition further comprises a hydroxysilane polysulfide coupling agent corresponding to the general formula (III):

$$(HO)_a R_{(3-a)} Si-R'-S_x-R'-SiR_{(3-b)}(OH)_b \qquad (III),$$

wherein the R radicals, which are identical or different, are hydrocarbon groups;
   wherein the R' radicals, which are identical or different, are divalent connecting groups;
   wherein a and b, which are identical or different, are equal to 1 or 2; and
   wherein x is a number greater than or equal to 2.

2. The tire according to claim 1, wherein the rubber composition includes less than 0.45 phr of guanidine derivative.

3. The tire according to claim 2, wherein the rubber composition includes less than 0.4 phr of guanidine derivative.

4. The tire according to claim 3, wherein the rubber composition is devoid of guanidine derivative.

5. The tire according to claim 1, wherein the primary amine is present in the rubber composition at a content of from 0.2 to 8 phr.

6. The tire according to claim 5, wherein the content of primary amine is from more than 0.3 phr to 7 phr.

7. The tire according to claim 6, wherein the content of primary amine is from 0.5 to 5 phr.

8. The tire according to claim 7, wherein the content of primary amine is from more than 0.6 phr to 4 phr.

9. The tire according to claim 1, wherein the primary amine of formula (I) bears an R radical, which represents a hydrocarbon group comprising from 10 to 22 carbon atoms.

10. The tire according to claim 9, wherein R represents a hydrocarbon group comprising from 12 to 20 carbon atoms.

11. The tire according to claim 10, wherein R represents a hydrocarbon group comprising from 14 to 20 carbon atoms.

12. The tire according to claim 1, wherein the primary amine of formula (I) bears an R radical, which represents a linear hydrocarbon group.

13. The tire according to claim 1, wherein the primary amine of formula (I) bears an R radical, which represents an alkyl group or an alkenyl group.

14. The tire according to claim 1, wherein the silica is present in the rubber composition at a content of from 30 to 150 phr.

15. The tire according to claim 1, wherein the reinforcing filler comprises a minor amount of carbon black.

16. The tire according to claim 15, wherein the carbon black is present in the rubber composition at a content of from 0.5 to 50 phr.

17. The tire according to claim 1, wherein the diene elastomer is selected from the group consisting of: polybutadienes, synthetic polyisoprenes, natural rubber, butadiene copolymers, isoprene copolymers, and mixtures thereof.

18. The tire according to claim 1, wherein the diene elastomer is predominantly composed of non-isoprene diene elastomer.

19. The tire according to claim 18, wherein the diene elastomer is composed of 100 phr of non-isoprene diene elastomer.

20. The tire according to claim 18, wherein the non-isoprene diene elastomer is selected from the group consisting of: polybutadienes, butadiene copolymers, isoprene copolymers, and mixtures thereof.

21. The tire according to claim 1, wherein the rubber composition further comprises a plasticizer.

22. The tire according to claim 21, wherein the plasticizer is selected from the group consisting of: plasticizing resins, extending oils, and mixtures thereof.

23. The tire according to claim 21, wherein the plasticizer is present in the rubber composition at a content of from 5 to 100 phr.

24. The tire according to claim 1, wherein the rubber composition comprises less than 0.3 phr zinc.

25. The tire according to claim 1, wherein the rubber composition is devoid of zinc.

26. The tire according to claim 1, wherein the R radicals are hydrocarbon groups comprising from 1 to 15 carbon atoms.

27. The tire according to claim 1, wherein the R' radicals are divalent connecting groups comprising from 1 to 18 carbon atoms.

28. The tire according to claim 1, wherein the coupling agent is a monohydroxysilane in which a and b are equal to 1.

29. The tire according to claim 1,
wherein the R radicals are selected from the group consisting of: $C_1$-$C_6$ alkyls, $C_5$-$C_8$ cycloalkyls, and a phenyl radical, and
wherein the R' radicals are selected from the group consisting of: $C_1$-$C_{18}$ alkylenes and $C_6$-$C_{12}$ arylenes.

30. The tire according claim 1, wherein the R radicals are selected from the group consisting of: $C_1$-$C_6$ alkyls and the R' radicals are selected from the group consisting of: $C_1$-$C_{10}$ alkylenes.

31. The tire according to claim 1, wherein the hydroxysilane is a monohydroxysilane polysulfide of formula (IV):

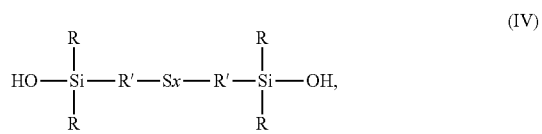

(IV)

wherein the R radicals are $C_1$-$C_3$ alkyls;
wherein the R' radicals are $C_1$-$C_4$ alkylenes; and
x is greater than or equal to 2.

32. The tire according to claim 31, wherein the R radicals are each methyl.

33. The tire according to claim 31, wherein the R' radicals are selected from the group consisting of: methylene, ethylene, and propylene.

34. The tire according to claim 1, wherein the hydroxysilane is a bis(propyldimethylsilanol) polysulfide of specific formula (IVa):

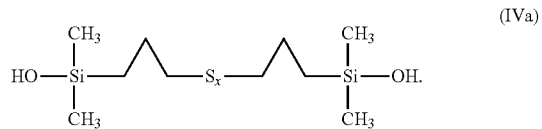

(IVa)

35. The tire according to claim 1, wherein the rubber composition is a composition of a tire layer selected from the group consisting of: all or part of a tread, all or part of a tire belt, and combinations thereof.

36. The tire according to claim 35, wherein the rubber composition comprises all or part of the tread.

37. The tire according to claim 2, wherein the rubber composition includes less than 0.4 phr of guanidine derivative, and
wherein the content of primary amine is from more than 0.6 phr to 4 phr.

* * * * *